E. F. SCHNUCK & R. & W. G. BURNS.
SCOOP-OUT BIN.
APPLICATION FILED MAY 7, 1915.
1,228,833.
Patented June 5, 1917.
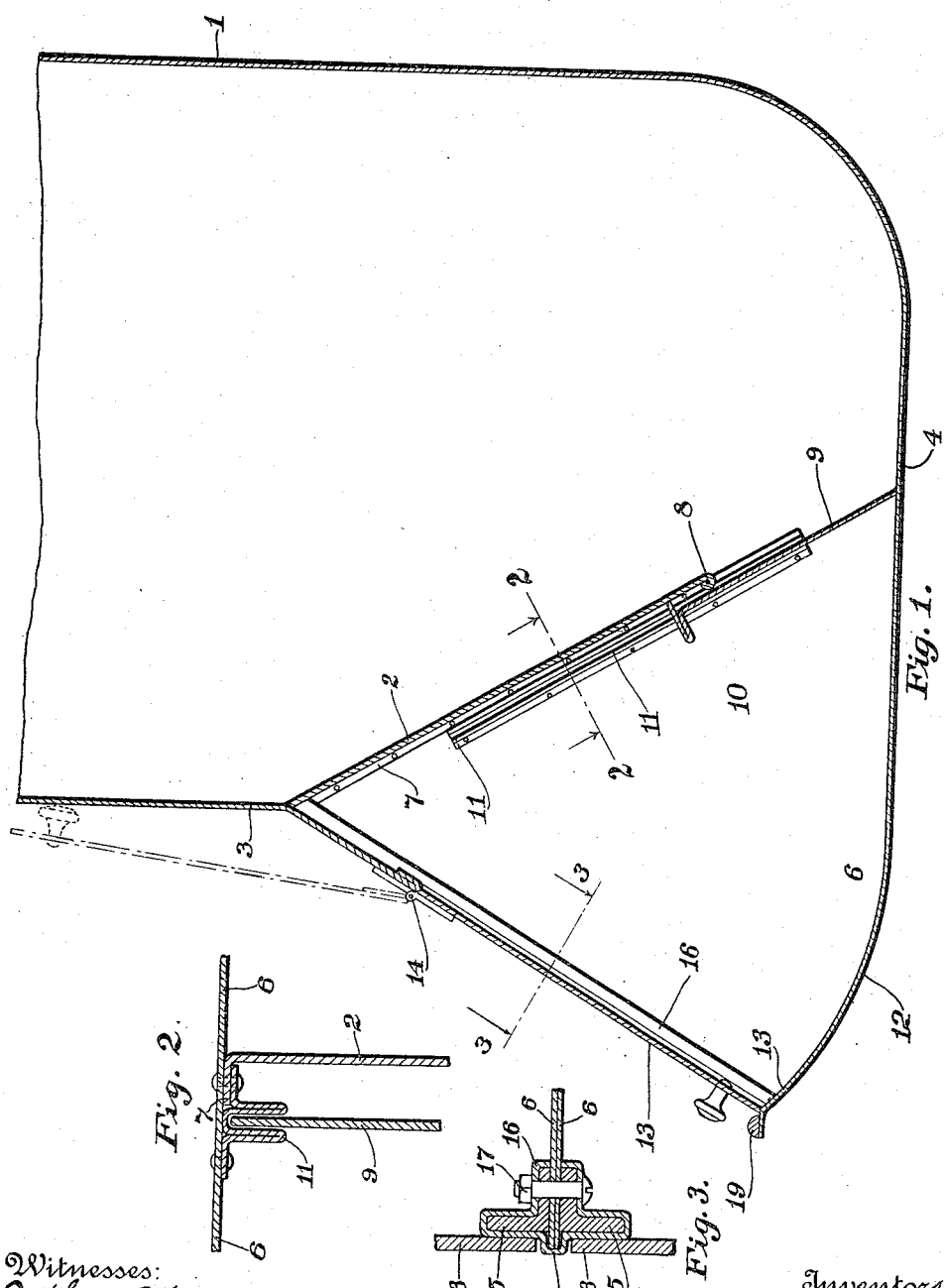

UNITED STATES PATENT OFFICE.

EDWARD F. SCHNUCK, OF GREENBURGH, AND ROBERT BURNS AND WILLIAM G. BURNS, OF NEW YORK, N. Y., ASSIGNORS TO JABEZ BURNS & SONS, A CORPORATION OF NEW YORK.

SCOOP-OUT BIN.

1,228,833.     Specification of Letters Patent.     Patented June 5, 1917.

Application filed May 7, 1915. Serial No. 26,487.

*To all whom it may concern:*

Be it known that we, EDWARD F. SCHNUCK, a citizen of the United States, residing at Greenburgh, in the county of Westchester and State of New York, and ROBERT BURNS and WILLIAM G. BURNS, citizens of the United States, and residents of New York, in the county of New York, State of New York, have invented certain new and useful Improvements in Scoop-Out Bins, of which the following is a full, clear, and exact specification.

This invention relates to scoop out bins and has particular reference to improvements in the structure of bins used for granular or comminuted materials such as tea, cereals, coffee, sugar and the like, wherein it is desired to scoop out small quantities from time to time without causing the entire supply to be discharged.

The invention consists of a chute or pipe leading from the main source of supply, and having its lower end suitably formed to support the weight of the material, and also provided with means for regulating the discharge of the material from the chute into the scoop out portion. Where large quantities of these materials are carried in stock, the chute may extend from an upper floor to the scoop out bins, and it is desirable not only to be able to regulate the flow from the chute into the scoop out portion so as to control the quantity in the latter, but also to prevent overflow and to keep the main body of material protected from air and dust, and yet permitting it to flow into the scoop out portion by gravity to replace that which is taken away. To this end the invention comprises a chute combined with a scoop out portion and separated by a movable door which can be set so as to permit the desired quantity of material to flow from the chute into the scoop out portion. Some materials flow more easily than others, and the provision of a movable door enables the flow to be controlled so that the material will neither jam in the chute, nor overflow the scoop out portion. The invention also consists in the detailed construction and arrangement of parts as will be more fully understood in connection with the description of the accompanying drawings, wherein—

Figure 1 is an elevation of the invention;

Fig. 2 is a detailed section on the line 2—2 of Fig. 1, and

Fig. 3 is a similar section on the line 3—3 of Fig. 1.

1 represents a chute which ordinarily leads from an upper floor and is a number of feet long, so that the weight of the material contained therein must be supported so that it will not overflow or jam. 2 represents an inclined partition extending from the front wall 3 of the chute diagonally to the bottom 4. This partition 2 is attached at each end to the division partitions 6 where these bins are arranged in banks, or if arranged singly to the opposite side walls of the chutes 1. The partitions 2 are flanged as at 7 and are firmly riveted to the side walls 6 so as to support the weight of the material without bending. The partitions 2 only extend part way from the front 3 to the bottom 4, and end at the reinforced edge 8. The opening between the edge 8 and the bottom 4 is closed by a slide 9, which is operated by handle 10. This slide 9 moves in guide-ways 11 which are formed by strips of material doubled to form channels, which are riveted to the side walls 6, as seen in Fig. 2. In front of the slide 9 is the scoop out bin 12, which consists of the bottom 4 curved upwardly as at 13, side walls 6, the partition 2 and the movable door 13, which is hinged at 14 and swings upwardly to the position shown in dotted lines in Fig. 1.

Fig. 3 shows the detailed construction whereby the partition walls 6 are stiffened and at the same time form seats for the doors 13. The walls themselves are each provided with an angle iron 15, which is covered with a sheathing 16, the angle iron and sheathing being bolted to the wall 6 by a single bolt 17. In Fig. 3 is shown the construction where the walls 6 abut between two bins, it being seen that each bin has its side wall 6, and angle iron 15, but one sheathing 16 and one bolt 17 are used, for fastening them together. Of course, where the wall 6 is an outside wall, but one angle iron would be used and the sheathing would be correspondingly changed, so as to be fastened inside and outside by the bolt 17. The purpose of the sheathing is to make smooth and ornamental joints, and at the same time cover corners in the partitions, where the material would be likely to lodge. It will also be seen that the walls 6 extend outwardly beyond the angle iron 15 and both it and the wall are covered by the sheathing 16, as at 18. This construction not only forms side seats for the doors 13, but finishes the structure as well.

When it is desired to use this scoop out bin, the door 9 is opened sufficiently to allow the material to flow into the scoop out space 13 without overflowing, and the usual scoops can then be inserted through the door 13 to pick up the material, it being seen that the edge of the scoop can slide along on the smooth bottom 12 without being obstructed. As fast as the material is removed by the scoop, an additional quantity determined by the opening of the slide 9 will flow in. The purpose of the incline 12 is to incline the scoop so that excess material will fall off the scoop while it is inside the bin. In this manner small quantities of material are supplied by gravity from the main supply as fast as scooped out, without exposing the entire supply to air and dust, and without waste by overflow. Thus by scooping out from the bottom while the fresh material flows in at the top, continuous circulation is obtained, and accumulation of stale material in the bottom prevented. The mounting of the slide 9 on the scoop side of the partition 2 is of advantage in that the partition stiffened at 8 carries the main weight of the material, and the slide 9 is thereby relieved, permitting it to be moved easily. Also, the material does not get in the guide channels for the slide, as the former do not extend to the bottom 4. The construction of stiffened side wall 6, which at the same time forms a seat for the doors 13 is also of advantage, owing to its simplicity and neatness and the doors 13, can extend the entire width of the bin. By hinging the door at 14 intermediate the top and bottom of the inclined front, the door stays open when thrown upwardly, as seen by the dotted line position in Fig. 1. 19 is a stiffening rod extending across the front, and also forming a bearing for the scoop when moved in and out.

The bin of this invention is adapted for all kinds of materials, or for very long chutes, as adjustment of the slide 9 permits the desired flow of any material or of any weight of material, such as would be contained in a very long pipe, without requiring baffles or other deflecting devices.

Having thus described our invention, what we declare as new and desire to secure by Letters Patent of the United States is:—

1. A bin comprising a chute having a scoop out portion extending forwardly therefrom, a partition plate fastened to the side walls of said bin between said chute and said scoop out portion, channeled guide strips fastened to said plate and to the side walls of said bin, said guide strips extending below said partition plate and terminating above the bottom of said bin, and a gate sliding in the channels of said guide strips.

2. In multiple scoop out bin construction, a plurality of bins, means for delivering material thereto, each bin having a bottom, a rear wall separating the scoop out portion from said delivering means, sides, and a door at the front for closing the scoop out portion, side walls for each bin comprising a plate at each side having an angle iron interiorly secured thereto to increase the stiffness and form opposite seats for the door, a sheathing covering the angle irons and the edges of adjoining side walls, and a single fastening means for holding said adjoining side walls, angle irons and sheathing together.

In testimony whereof we affix our signatures.

EDWARD F. SCHNUCK.
ROBERT BURNS.
WILLIAM G. BURNS.

Copies of this patent may be obtained for five cents each, by addressing the "Commissioner of Patents, Washington, D. C."